Nov. 18, 1958

G. J. WOLFF 2,860,933

BEARING FOR DEVICE FOR TRANSMITTING ROTARY
MOTION INTO A SEALED CHAMBER

Filed Aug. 4, 1955

INVENTOR
G. J. WOLFF
BY
H. O. Wright
ATTORNEY

United States Patent Office 2,860,933
Patented Nov. 18, 1958

2,860,933

BEARING FOR DEVICE FOR TRANSMITTING ROTARY MOTION INTO A SEALED CHAMBER

George J. Wolff, Mountainside, N. J., assignor to Bell Telephone Laboratories, Incorporated, New York, N. Y., a corporation of New York Application August 4, 1955, Serial No. 526,531

3 Claims. (Cl. 308—238)

This invention relates in general to control mechanisms designed to operate through walls of sealed enclosures, and more particularly, to improved devices for transmitting rotary motion from an external source to a rotatable element within a highly evacuated enclosure.

Devices for transmitting rotary motion into a sealed chamber are at present available commercially. One such device, disclosed by F. D. Herbert, Jr. in Patent 2,419,074, which issued April 15, 1947, utilizes a rod extending through a sealed but flexible portion of the chamber. In response to manipulation at the externally protruding end of the rod, its inner end executes a conical motion about a pivotal point located within a gas-tight bellows. The bellows performs the dual functions of permitting the pivotal motion of the rod, while maintaining a gas-tight seal in the region through which the rod extends into the chamber. The end of the rod within the sealed chamber moves in a circular path, and serves to rotate a shaft mounted in a bearing within the sealed chamber.

For operation in connection with very high vacua, devices of the type disclosed by Herbert, and other similar devices known in the prior art, have been found to have several disadvantages. For example, they cannot, without injury to the materials of which they are constructed, be readily freed from occluded gases by baking. Moreover, they require, for smooth operation, the lubrication of a bearing situated within an evacuated portion of the structure. These are both factors of primary importance where it is desired to obtain and maintain evacuated pressures as low as, for example, $10^{-9}$ millimeters of mercury, since the occluded gases given off by the chamber walls of elements within the evacuated space, and in addition, the vapors given off by the lubricants, render such low pressures (high vacua) very difficult to obtain and to maintain.

These and other disadvantages have been largely eliminated by certain modifications, in accordance with the present invention, in a device of the general form disclosed by Herbert, Jr., in Patent 2,419,074 supra. In accordance with a principal modification, the rotating shaft, within the vacuum chamber, is journaled in a heat-resistant bearing of glass, or any similar smooth, hard material, requiring no lubricant and exuding substantially no vapors. A further modification involves mounting the aforesaid bearing of glass, or the like, in a sleeve comprising a metal having a coefficient of expansion which approximates that of the bearing. Inasmuch as the arrangements of the invention permit the unit to be readily "outgassed" by baking at temperatures in excess of 420 degrees centigrade, and further, since no lubricant is present to give off vapors within the chamber to be evacuated the requirements for operation at pressures as low as $10^{-9}$ millimeters of mercury are met.

These and other objects, features and advantages of the present invention will be better understood from the detailed description of an illustrative structure of the invention given hereinafter, in connection with the attached drawings, in which.

Figure 6:
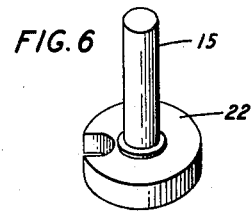
Figure 7:
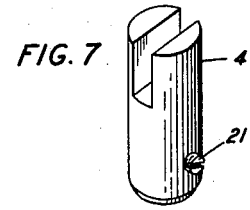

Fig. 6 shows, in perspective, disassembled, the shaft 15 which rides in the bearing 16; and Fig. 7 shows, in perspective, the slotted connector 4 which fits onto the end of the shaft 15 to support an element for rotation within the evacuated chamber.

Figure 1:
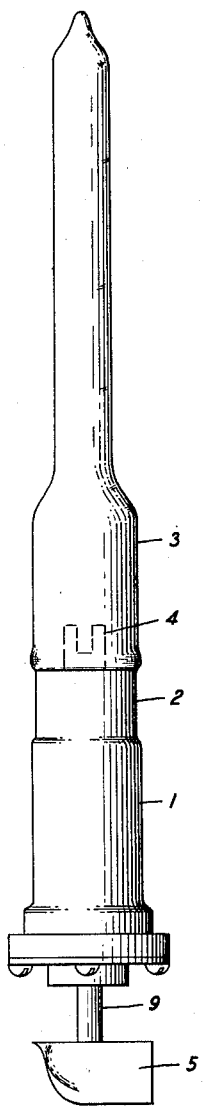
Fig. 1 is an enlarged perspective showing of a high-vacuum unit embodying the present invention.

Referring in detail to the drawings, Fig. 1 shows, in perspective, a high-vacuum chamber embodying a typical application of the present invention. The cylindrical metal housing 1 which includes a rotary drive assembly of the general form disclosed in Patent 2,419,074 to Herbert, supra, modified in accordance with the present invention, is sealed, by means of a cylindrical metal shell 2, to the glass enclosure 3. Rotary motion is translated from an external source to the slotted connector 4 through the rotary drive assembly by manipulation of the knob 5. Knob 5 is preferably designed to be readily removable while the assembly is being baked to expel occluded gases.

Figure 2A:
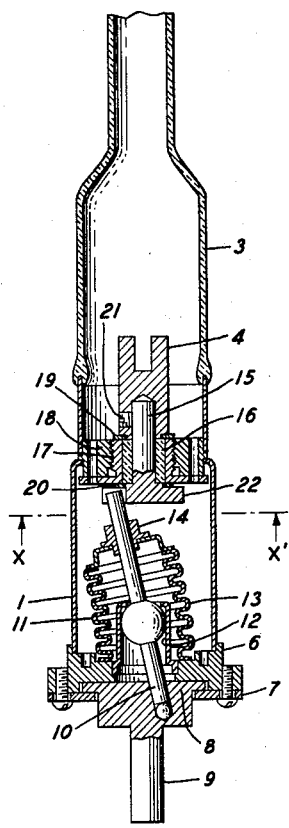
Fig. 2A shows a sectional elevation of the unit shown in perspective in Fig. 1.
Figure 2B:
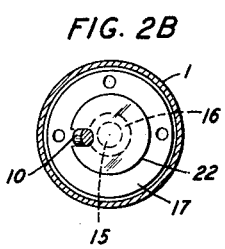
Fig. 2B shows a cross-section along the line X—X' of the sectional elevation of Fig. 2A.
Figure 3:
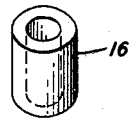
Fig. 3 shows, in perspective, the bearing 16 of Figs. 2A and 2B, disassembled from the combination.
Figure 4:
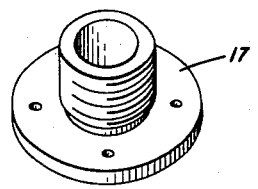
Fig. 4 shows, in perspective, the inner component 17 of the metal sleeve which supports the bearing 16.
Figure 5:
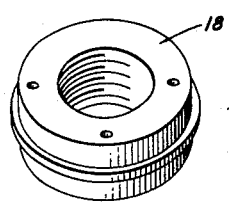
Fig. 5 shows, in perspective, the outer component 18 of the aforesaid metal sleeve.

Referring to the detailed sectional elevation shown in Fig. 2A of the drawings, the lower end of the housing 1 is soldered to the inner periphery of an upwardly extending flange on the base plate 6. This and all other soldering operations performed in connection with this assembly are preferably carried out by induction heating in a hydrogen atmosphere, preferably using a solder which consists of substantially 72 percent silver and 28 percent copper. The solder employed should, obviously, contain no components which give off any appreciable amount of vapor at extremely low pressures or at temperatures of the order of 420 degrees centigrade, to which the assemblage may be heated to expel occluded gases. An annular cover plate 7 is fastened by screws to the lower surface of the base plate 6, forming therewith an inner annular groove having a horizontal flange as shown.

In preferred form, the housing 1 comprises a metal known under the trade name "Kovar," which is an iron-nickel-cobalt alloy of the general composition defined in Patent 1,942,260 to Howard Scott, January 2, 1934, and which is characterized by a coefficient of expansion approximating that of Pyrex glass. The base plate 6 and the annular cover plate 7 are, preferably, machined from cold-rolled steel, and are copper plated.

The shaft 9, which is manipulated by the knob 5 (shown in Fig. 1), protrudes from the center of a cylindrical driving plate 8, with which it is integrally formed of stainless steel. The cylindrical driving plate 8 includes an outwardly extending circular flange which fits into and is disposed to rotate in the groove formed between the base plate 6 and the cover 7, as shown.

Mounted with one end bearing eccentrically on the driving-plate 8, is a steel drill rod 10, which passes through and pivots about a Phosphor-bronze ball 11 accommodated in a cylindrical socket 12, which is open at one end and partially closed at the other. The circular lower end of socket 12 is attached by a ring of solder to the inner surface of a circular opening of suitable diameter at the center of the base plate 6, as shown. A Phosphor-bronze bellows 13, having a larger opening at its lower end and a smaller opening at its upper end, is placed about and extends appreciably above the socket 12, with the end including the larger opening soldered into a groove in the base plate 6, concentric with the opening therein. The longer or upper end of the steel drill rod 10 passes out through the smaller opening of the bellows 13, which is closed by a "Kovar" cup 14, soldered to the bellows and the protruding portion of the rod. The end of rod 10 protruding from the "Kovar" cup 14 bears in a slot which is disposed eccentrically on the periphery of the flanged portion 22 of the rotatable drive shaft 15.

In accordance with the present invention, the drive shaft 15 rides in a bearing 16 comprising a material presenting a sufficiently hard and smooth surface to the shaft 15 to make the use of lubricant unnecessary. For best results, the coefficient of friction between the metal of the drive shaft and the chosen bearing material should be less than .05. The material should have a highly scratch-resistant surface, and should have a sufficiently high melting point so that it produces negligible vapor pressure at temperatures of the order of about 420 degrees centigrade to which the system is raised to expel occluded gases. For the purposes of the present embodiment, for example, the bearing 16 preferably comprises a borosilicate glass, known in the art as "Pyrex," and described on page 534, Section 4, of the Standard Handbook for Electrical Engineers, eighth edition, McGraw-Hill, 1949. The bearing 16 comprises a Pyrex tube of which the inner and outer cylindrical surfaces are closely concentric, and which is so dimensioned that the inner diameter accommodates the drive shaft 15 with a small tolerance, and the outer diameter fits accurately into a cylindrical opening reamed in the bearing holder 17, the latter being formed of "Kovar" which has a coefficient of expansion approximating that of the Pyrex glass forming the bearing 16. The element 17, the lower portion of which has an outwardly extending flange, screws into the annular "Kovar" cup 18, so that the upper surface of the flange is coextensive with the lower surface of the latter, and is secured to it with several screws. Holes in the flange of member 17 are aligned with holes in member 18 so that the pressures above and below the assembly including these two elements will at all times be substantially the same. The lower edge-portion of the cylindrical "Kovar" shell 2, the upper edge of which is sealed to the mouth of the glass chamber 3, is soldered to a flange extending outwardly from the annular "Kovar" cup 18.

The relationships between the bearing 16, the "Kovar" supporting members 17 and 18, the shaft 15, and the connector 4, will be more clearly understood by reference to the cross-sectional view 2B, and the perspective drawings in Figs. 3, 4, 5, 6 and 7 which show the respective elements unassembled.

The Pyrex bearing 16 is held in place in the bearing holder 17 by a pair of "Kovar" washers 19 and 20 spot-welded to the upper and lower surfaces of the holder 17. The protruding upper end of the drive shaft 15, journaled in the bearing 16, fits into a cylindrical opening concentrically located in the lower end of connecting element 4, the latter being attached to shaft 15 by means of a set screw 21. Accordingly, the shoulder on the the lower end of element 4, protruding through washer 19, bears exclusively on the upper end of glass bearing 16. In a similar manner, a shoulder extending upwardly from the flange 22 around the base of the drive shaft 15 bears on the lower end of glass bearing 16. Accordingly the drive shaft 15 can turn freely in bearing 16 and thereby cause the slotted connector 4 to execute a rotary motion which may be translated to any element mounted thereon.

The partial assembly, including the bearing 16 and the bearing holder 17, is screwed into place through the large end of the housing 1, preferably with a wrench or other suitable tool, prior to the step of soldering of the base plate 6 to the lower end of housing 1, care being taken that the holes in member 17 register with those in member 18 and that the inner terminal of the rod 10 fits into the slot provided in the flange 22 of the drive shaft 15 so that the latter does not bind in the bearing 16.

The metal portions of the outer surface of the completed overall assemblage of Fig. 1 are preferably coated with aluminum paint in order to reduce oxidation during the repeated baking operations.

Although the mechanism of the present invention has been described with reference to a particular assembly of elements, it will be apparent to those skilled in the art that the principles taught herein are applicable to other types of high vacuum motion control systems.

What is claimed is:

1. A sleeve bearing which comprises a drive shaft of metal, a lubrication-free journal supporting said shaft and composed of a hard, smooth, substantially vapor-free, heat-resistant, vitreous material characterized by a coefficient of friction of less than 0.05 with respect to said shaft, said metal having a coefficient of thermal expansion which approximates that of said vitreous material over a range of temperatures extending up to about 420 degrees centigrade.

2. A bearing as defined in claim 1 wherein said vitreous material is a borosilicate glass.

3. A bearing as defined in claim 1, wherein said metal is an alloy containing at least 12 percent of cobalt and at least 15 percent of nickel, said cobalt and nickel together amounting to from 43 to 55 percent of the whole, the balance being substantially iron.

References Cited in the file of this patent

UNITED STATES PATENTS

| 2,265,065 | Daywalt | Dec. 2, 1941 |
| 2,454,340 | Reichel | Nov. 23, 1948 |

FOREIGN PATENTS

| 142,211 | Switzerland | Nov. 17, 1930 |